United States Patent
Takeuchi et al.

(10) Patent No.: US 6,702,464 B1
(45) Date of Patent: Mar. 9, 2004

(54) DYNAMIC PRESSURE BEARING WITH IMPROVED STARTING CHARACTERISTICS

(75) Inventors: Hisao Takeuchi, Itami (JP); Osamu Komura, Itami (JP); Kaoru Murabe, Itami (JP); Makoto Otsuki, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/856,093

(22) PCT Filed: Sep. 14, 2000

(86) PCT No.: PCT/JP00/06297

§ 371 (c)(1),
(2), (4) Date: Aug. 16, 2001

(87) PCT Pub. No.: WO01/21969

PCT Pub. Date: Mar. 29, 2001

(30) Foreign Application Priority Data

Sep. 17, 1999 (JP) ............................. 11/263614
Nov. 11, 1999 (JP) ............................. 11/321086
Nov. 22, 1999 (JP) ............................. 11/331211

(51) Int. Cl.[7] .................................... F16C 17/10
(52) U.S. Cl. ............................. 384/107; 384/115
(58) Field of Search ........................ 384/113, 107, 384/115, 114, 123

(56) References Cited

U.S. PATENT DOCUMENTS 5,980,113 A * 11/1999 Grantz ...................... 384/108

FOREIGN PATENT DOCUMENTS

| JP | 55-36456 | 8/1953 |
|---|---|---|
| JP | 55-36456 | 8/1978 |
| JP | 60-234120 | 11/1985 |
| JP | 63-157520 | 4/1987 |
| JP | 157520/1988 | 10/1988 |
| JP | 3-99219 | 1/1990 |
| JP | 2-278007 | 11/1990 |
| JP | 99219/1991 | 10/1991 |
| JP | 5-141419 | 6/1993 |
| JP | 5-240241 | 9/1993 |
| JP | 8-296649 | 11/1996 |
| JP | 9-328381 | 12/1997 |
| JP | 11-18357 | 1/1999 |
| JP | 11-55918 | 2/1999 |
| JP | 11-311245 | 11/1999 |
| JP | 2000-120664 | 4/2000 |

* cited by examiner

*Primary Examiner*—Lenard A. Footland
(74) *Attorney, Agent, or Firm*—McDermott, Will & Emery (57) ABSTRACT

A hydrodynamic bearing assembly with improved activation features is provided. The opposing surfaces in the radial and thrust bearings have grooves 2 and 5 with depths shallower gradually towards the downstream flow of the fluid passing therethrough, for generating the uniform dynamic pressure distribution. This allows the dynamic pressure distribution to be leveled so as to increase the bearing supporting force and prevent the dew grom being generated. Any one or both of the opposing surfaces in the thrust bearing has the inclined surface from the inner portion towards the outer portion so that the gap between the opposing surfaces is extended to about 2 microns. This causes the contacting points thereof when halted to be closer to the axis so that the friction can be reduced and the driving torque can be reduced when restating the bearing assembly. This also prevent the contact in the thrust bearing due to the external oscillating motion. Further, a second thrust plate 11 is secured on the other end surface of the sleeve 3 opposite to the thrust plate 4 so that the total weight of the rotational member is supported between the second thrust plate 11 and the end surface of the shaft 1 when halted, thereby reducing the friction at the time of activating.

7 Claims, 8 Drawing Sheets

DYNAMIC PRESSURE BEARING WITH IMPROVED STARTING CHARACTERISTICS

TECHNICAL FIELD

This invention relates to a hydrodynamic bearing assembly incorporated with a spindle motor used for driving a memory device such as a hard disk drive (referred to as a "HDD", hereinafter), or a bar code scan reader, and in particular, relates to the hydrodynamic bearing assembly, which has an improved activation feature.

BACKGROUND ART

The hydrodynamic bearing assembly for use in a spindle motor of the memory device such as the HDD and a drive unit for driving a polygonal mirror in the bar code reader has been required to attain a high rate, stable rotation under a high load, to have a high bearing rigidity that prevents the rotational member from making contacts with the stationary member even under the existence of external vibrations, thereby to have a reduced starting torque, and to have an improved activation feature with a reduced wear caused by the frictional rotations.

Figure 8:
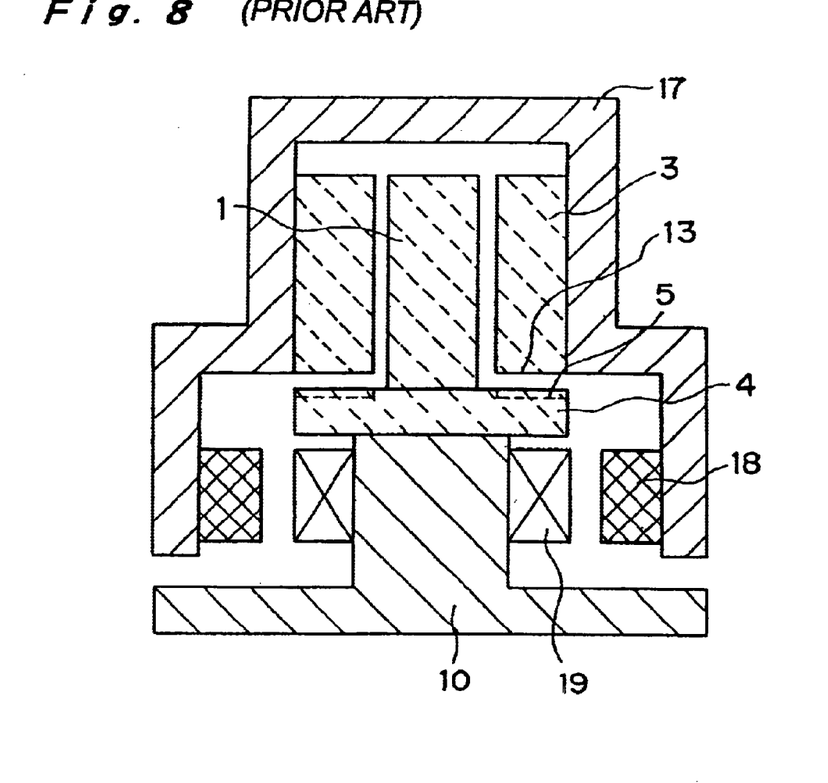
FIG. 8 is a cross section of the spindle motor incorporating the conventional hydrodynamic bearing assembly.

FIG. 8 illustrates one example of a conventional spindle motor. In the drawing, a column shaft 1 and a disk-shaped thrust plate 4 are secured on a base 10. The thrust plate 4 is attached perpendicularly to the shaft 1. The shaft includes an outer surface parallel to the axis of the shaft 1. A cylindrical hollow sleeve 3 is rotatably arranged around the outer surface of the shaft 1 with a predetermined gap so that a hydrodynamic bearing is defined between the shaft 1 and sleeve 3. Thus, the radial bearing is defined between the outer surface of the shaft 1 and the inner surface of the sleeve 3 for generating a radial dynamic pressure in the radial direction perpendicular to the axis. Also, a thrust bearing is defined between a bottom surface of the sleeve 3 (which is referred to as a thrust-opposing surface of the sleeve 3, hereinafter) and the thrust plate 4 for generating a thrust dynamic pressure in the thrust direction parallel to the axis. Grooves 5 for generating the thrust dynamic pressure are formed on a surface of the thrust plate 4 opposing to the thrust-opposing surface of the sleeve 3. A rotor 17 is attached with the sleeve 3 such that it can rotate together with the shaft 1 around the sleeve 3. Information media (in case of the HDD) or a polygonal mirror (in case of the bar code scan reader) is mounted on the outer surface of the rotor 17. A rotor magnet 18 is attached on the inner surface of the rotor 17 and opposes to a stator coil 19 mounted on a base 10.

Figure 9:
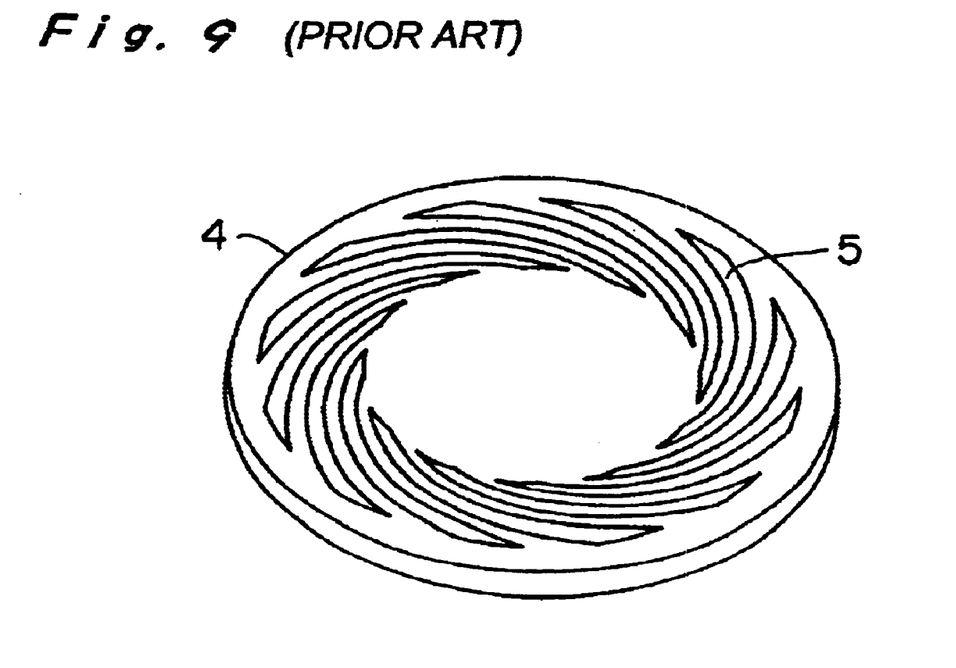
FIG. 9 is a perspective view of the prior art thrust plate having thrust grooves for generating dynamic pressure.

FIG. 9 illustrates a detail of the grooves 5 formed on the thrust plate 4 for generating the thrust dynamic pressure. A plurality of spiral grooves is formed on the thrust plate 4, and each groove is designed to be inclined with a predetermined angle relative to the circle and generally has a width of several microns (approximately 1 to 5 microns). Although FIG. 9 shows the grooves 5 formed on the thrust plate 4, the grooves 5 may be formed on the thrust-opposing surface 13.

In the rotation of the spindle motor so constructed, the stator coil (not shown) energized by the electric flow generates the attraction/repulsion force. This provides a rotation driving force with the rotor 17 having the rotor magnet 18 to rotate both of the rotor 17 and the sleeve 3 secured thereto around the shaft 1. A relative movement between the shaft 1 and the sleeve 3 due to the rotation generates the radial dynamic pressure through a fluid such as air intervened therebetween. Also, the relative movement between the thrust plate 4 and thrust-opposing surface 13 of the sleeve 3 in cooperation of the grooves 5 generates the thrust dynamic pressure. The radial and thrust dynamic pressures keep the rotational member such as the sleeve 3 and the rotor 17 away from the stationary member such as shaft 1 and the thrust plate 4 during the rotation.

Figure 10:
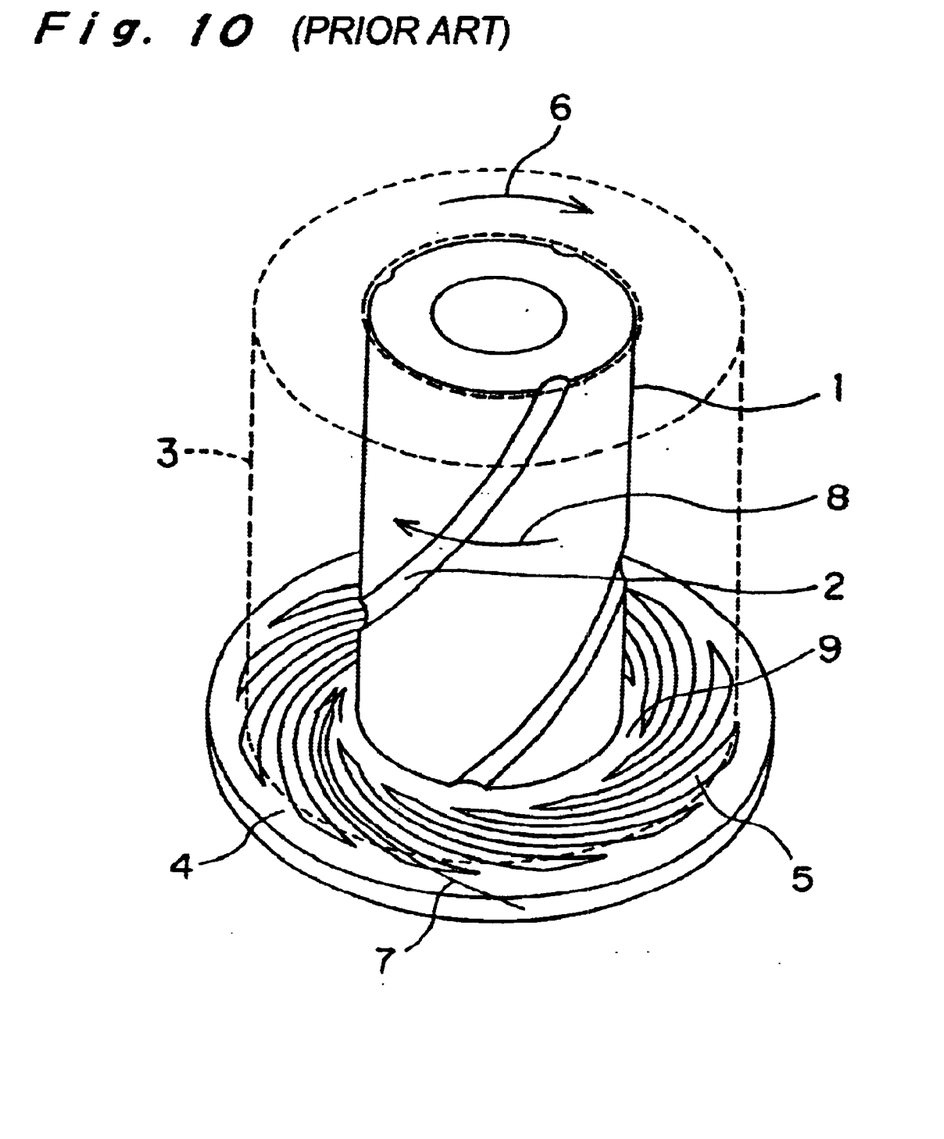
FIG. 10 is a enlarged perspective view illustrating only the hydrodynamic bearing assembly in FIG. 8.

FIG. 10 is an enlarged perspective view of the hydrodynamic bearing assembly in isolation used for the spindle motor of FIG. 8. In the drawing, the thrust plate 4 is secured on one end of the shaft 1 perpendicular to the axis. The sleeve 3 indicated by a phantom line is rotatably arranged around the outer surface of the shaft 1. When the spindle motor is energized to activate, the rotational member such as sleeve 3 starts to rotate in contact with the thrust plate 4 due to its own weight. The spiral grooves 5 in cooperation with the rotation of the sleeve 3 indicated by the arrow 6 conducts the fluid such as air into the thrust bearing between the sleeve 3 and the thrust plate 3 and forces the fluid towards the center of the thrust plate 4 along the direction indicated by the arrow 7. A land portion 9 is defined between the spiral grooves 5 and the outer surface of the shaft 1, in which the forced fluid are compressed between the land portions 9 and inner end portions of the grooves 5 so as to generate the dynamic pressure for supporting the sleeve 3. Thus, according to the conventional hydrodynamic bearing assembly, the thrust dynamic pressure to be generated has peaks localized adjacent to the land portion 9.

FIG. 10 shows another example of the hydrodynamic bearing assembly, having the shaft 1 with another grooves 2 offset to the axis, which are formed on the outer surface and opposes to the inner surfaces of the sleeve 3. The grooves 2 are not essential to generate the radial dynamic pressure. However, the rotational member such as the sleeve 3 in the drawing rotates around the bearing axis of the stationary member such as the shaft 1, and also it may whirl (revolve) around another axis offset to the bearing axis, which is referred to as a half-whirl phenomenon. The half-whirl results in whirling of the functional components such as the information media and the polygonal mirror mounted on the rotor 17, thereby to cause malfunctions in utilizing the components. The grooves 2 formed on the outer surface of the shaft 1 advantageously avoid the half-whirl. The grooves may have various configurations for avoiding the half-whirl, including the offset grooves as shown in the drawing, grooves parallel to the axis, and the herringbone-shaped grooves. However, when the grooves 2 are offset to the axis, advantageously, the rotation of inner surface of the sleeve 3 in the direction indicated by the arrow 8 forces the fluid from the top end to the bottom end due to its viscosity, thereby further increasing the dynamic pressure in the thrust bearing. Also, the grooves 2 may be formed on the inner surface of the sleeve 3, rather than on the outer surface of the shaft 1.

The dynamic pressure distribution in the radial bearing is generated similar to that of the thrust bearing. Thus, the rotation of the sleeve 3 in the direction opposing to the grooves as indicated by the arrow 8, in cooperation with its viscosity, forces the fluid in the grooves from the upper end (right side of the drawing) to the lower end (left side). To this end, it is assumed that the dynamic pressure distribution is uneven, increasing the dynamic pressure adjacent the bottom ends of the groove 2.

Figure 11:
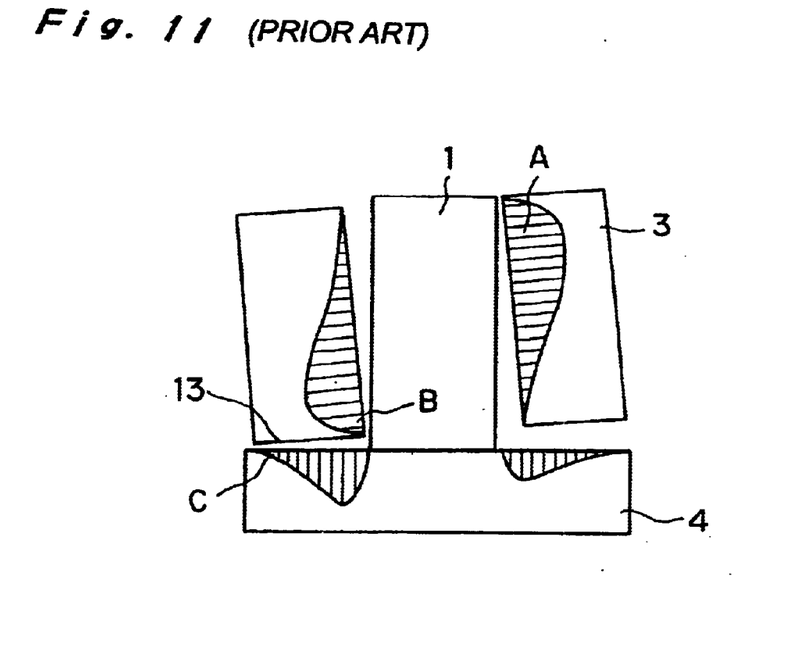
FIG. 11 is a schematic view of the dynamic pressure distribution in the hydrodynamic bearing shown in FIG. 8.

FIG. 11 illustrates the hydrodynamic bearing assembly having the sleeve 3, which is whirled and inclined relative to the shaft 1 and the thrust plate 4 due to the external factors applied to the bearing assembly. The sleeve 3 is inclined counterclockwise relative to the shaft 1, the shaft 1 moves closer to the sleeve 3 at the upper right portion A and the lower left portion B in the drawing. Also, the thrust plate 4 moves closer to the thrust-opposing surface at the leftmost portion C.

The parallel lines indicated in the drawing schematically illustrates the dynamic pressure in the radial and thrust bearings when the shaft 1 is inclined relative to the sleeve 3. As the shaft 1 moves closer to the sleeve 3 adjacent to the portion A, the wedge effect due to the convolution of the fluid therebetween generates the higher dynamic pressure. The same effect is observed adjacent to the portion B. Therefore, the counter forces due to the dynamic pressure adjacent to the portions A and B are generated against the contacting force between the shaft 1 and sleeve 3, and the contact between the shaft 1 and the sleeve 3 is avoided unless the external oscillation force overcomes the counter forces.

Meanwhile, the fluid is guided from the circumference of thrust plate 4 towards the axis so that the dynamic pressure between the thrust plate 4 and the thrust-opposing surface 13 is lower adjacent to the portion C and greater towards the bearing axis. Thus, the dynamic pressure around the portion C is low even if the thrust plate 4 and the thrust-opposing surface 13 moves closer. This may cause the thrust plate 4 and the thrust-opposing surface 13 to contact with each other around the portion C, when the external force such as the oscillating motion is applied. Once they contact with each other, the friction force therebetween results the unstable rotation of the rotational member. Further, the rebound followed by the contact causes the undesired impact, which could bring the malfunction of the magnetic head used for the HDD, or could result an extensive damage to the spindle motor.

As can be seen from the above description, the conventional hydrodynamic bearing assembly has following several disadvantages. Firstly, the high dynamic pressure distribution has peaks localized in certain portions within the gap defined by the hydrodynamic bearings, and if the compressed fluid is gas such as air, then the air locally compressed in the portions may generate a dew in the portions, because the water vapor in the air is compressed. The dew may cause no adverse effect while the bearing assembly keeps rotating so that the continuous flow of the fluid blows off the dew. However, when the electric power is interrupted and the rotation is halted, the sleeve 3 stops and contacts with the thrust plate 4 while the dew is remained therebetween. To this end, the dew between the sleeve 3 and the thrust plate 4 causes them to closely fit with each other, resulting some activating disadvantages when the bearing assembly is restated.

Secondary, when the external forces is applied to the bearing assembly to tilt the shaft relative to the sleeve, the thrust bearing generates the dynamic pressure (particularly in the circumference thereof) insufficiently to bear the external forces. Thus, the sleeve 3 and the thrust plate 4 are likely to contact with each other due to such external forces. This comes from the fact that the dynamic pressure distribution has the peak in the portions adjacent to the bearing axis.

Thirdly, when the spindle motor is halted, the weight of the rotational member causes the thrust opposing surface 13 as the bottom surface of the sleeve 3 to contact with the thrust plate 4. Both of the thrust opposing surface 13 and the sleeve 3 have even surfaces allowing a full contact therebetween. When the spindle motor is restated, the greater activating torque, is required enough to overcome the friction force of the full contact. Thus, the capability of the motor should be increased, resulting more energy consumption. Further, the rotational member rotates relative to and in contact with stationary member until the dynamic pressure generated therebetween is enough for floating the rotational member away from the stationary member. The rotation in contact causes both members to wear and generate the abraded particles, which brings an adverse effect to the precise bearing assembly. Even worse, the seizure of the bearings may be caused due to the greater friction force. Thus, the rotation in contact reduces the endurance and the reliability of the hydrodynamic bearing assembly or the spindle motor incorporating thereof.

The conventional techniques have proposed various approaches in order to address those disadvantages. For example, Japanese Patent Laid-Open Publication Nos. 11-18357 and 11-55918 disclose, in particular, the technique for preventing the contact in the thrust bearing due to the tilt of the shaft. According to the prior art techniques, the coil is arranged eccentrically with the rotor magnet so that the shaft is biased against the sleeve in a predetermined direction, allowing the rotation in a stable manner. However, the art requires the coil to be positioned concentrically with the bearing assembly for biasing the shaft to the sleeve in parallel. This arrangement is often impossible because of the design restriction.

Japanese Utility Model Laid-Open Publication No. 55-36456 discloses the stationary permanent magnet attached to the housing opposing to the rotor magnet for tilting the rotor towards the predetermined direction for the rotation. However, this technique decreases the lifetime of the bearing assembly because the distal edge of the shaft contacts with the sleeve.

Figure 12:
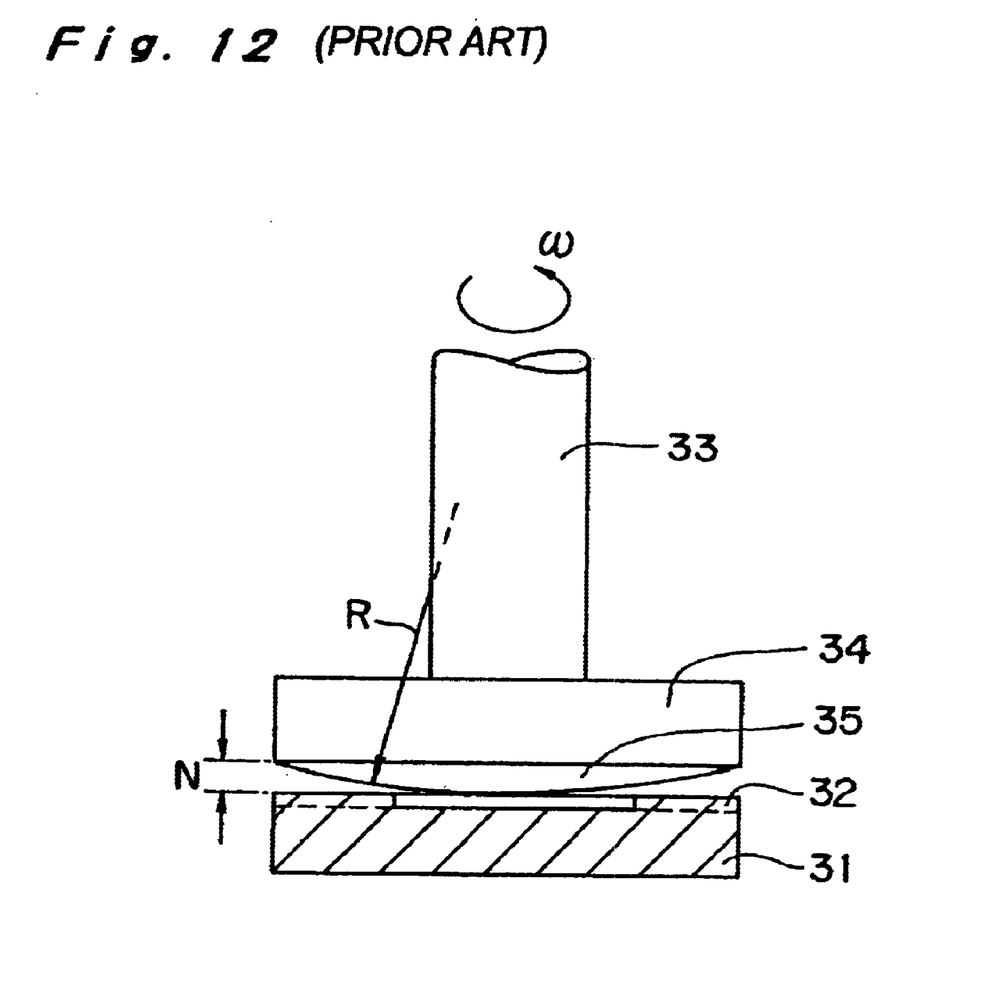
FIG. 12 is a partially fragmentary side view of the embodiment of the prior art hydrodynamic bearing assembly having the activating feature.

Also, Japanese Patent Laid-Open Publication No. 60-234120 discloses the technique for reducing the torque when activated, in which at least one of the thrust opposing surface and the thrust plate has a convex configuration in the thrust bearing as illustrated in FIG. 12. In the drawing, a plurality of grooves 32 for generating the dynamic pressure are formed on the thrust plate 31, and the shaft 33 rotates around the axis in a direction indicated by the arrow w. A thrust member 34 is secured on the bottom end, which opposes to the thrust plate 31. The thrust member 34 and the thrust plate 31 together define the thrust bearing. The thrust member is designed such that it has a spherical surface 35 with a predetermined radius R opposing to the thrust plate 31 and the spherical surface 35 protrudes by the protruding thickness N.

The rotation keeps the thrust plate 31 and thrust member 34 of the thrust bearing away from each other, and the halt of the rotation causes them in a small region. However, since the contacting area is a pinpoint, the rotational member can be activated and floated without any excessive torque nor galling.

However, the central portion of the spherical surface 35 may contact with the thrust plate 31 and the rotational member may not float away therefrom depending upon the radius R and the protrusion N of the spherical surface 35. Also, the thrust member has to be processed such that it has the spherical surface 35, in which it is difficult to form such a small convex surface.

Also, Japanese Patent Laid-Open Publication No. 9-328381 discloses the technique for reducing the frictional coefficient between the thrust contacting surfaces by forming one of the thrust contacting surfaces of an amorphous hard carbon film and the other of ceramics material having the void occupying rate of 6% or less and the maximum diameter of 10 microns or less.

However, while the reduced torque corresponding to the reduced frictional coefficient due to the fixed lubricant film is observed, no further improvement can be expected by this technique, because the thrust contacting surfaces are kept in full contact therebetween, the circumference thereof, in particular, has the longer radius, which can be harmful to contribute the reduction of the activation torque.

SUMMARY OF THE INVENTION

This invention is to provide a hydrodynamic bearing assembly, which eliminates the disadvantages of the conventional technique, realizes an even dynamic pressure distribution without extreme pressure peaks localized in the grooves for generating dynamic pressure to avoid the malfunctions because of the dew in the hydrodynamic bearings, and endures against the external oscillation applied to the thrust bearing. Also, this invention includes a process for preventing the dew from being generated in the hydrodynamic bearings by causing the dynamic pressure distribution in the grooves to be kept substantially even.

Further, this invention is to provide a hydrodynamic bearing assembly, in which the full contact between the thrust plate and the thrust opposing surface is avoided so that the friction and the energy consumption are reduced in comparison with the prior art technique, a reduced activating torque ensures the rotational member to float away from the stationary member, and the high rigidity against the external oscillation is achieved.

Even further, this invention is to provide a spindle motor rotating in a stable manner with an improved activation feature and the tilt rigidity as described, and also to provide a memory device and a bar code scanning device with the improved endurance and the reliability.

In particular, one aspect of the present invention is to provide the hydrodynamic bearing assembly comprises: a rotational and stationary members arranged with predetermined gaps to each other, the gaps including a radial gap defined therebetween in a radial direction perpendicular to an axis or a thrust gap defined therebetween in a thrust direction parallel to the axis, the gap containing a fluid for generating a radial or thrust dynamic pressure due to the relative rotation between the rotational and stationary members so that the rotational member rotate relative to the stationary member without any contact; wherein said rotational and stationary members have opposing surfaces to each other, and any one of the opposing surfaces has grooves formed thereon, the grooves having the depth modified in accordance with its position so that the dynamic pressure generated across the gap is substantially even. The depth of the grooves is modified to level the dynamic pressure so that the counter force against the tilting force in the thrust bearing is improved, and the dew generated under the peak pressure in the thrust bearing can be reduced. In order to level the dynamic pressure in the grooves, preferably, the grooves have the depth modified gradually and smoothly towards the downstream flow of the fluid passing therethrough.

Another aspect of the present invention is to provide the hydrodynamic bearing assembly comprises: a disk-shaped thrust plate extending in a radial direction perpendicular to a bearing axis; a circular thrust opposing surface extending in the radial direction and opposing to the thrust plate; and a thrust bearing for generating the thrust dynamic pressure in a thrust direction parallel to the bearing axis due to a relative rotation between the thrust plate and the thrust opposing surface; wherein at least one, or both of opposing surfaces of the thrust plate and the thrust opposing surface are inclined such that a distance between both opposing surfaces thereof becomes greater from an inside portion towards an outer portion of the thrust bearing. The gradient is preferably formed such that it hardly has an influence to the thrust dynamic pressure but avoids the contact due to the tilt. In particular, preferably, either one or both of opposing surfaces in the thrust bearing have the frustum or spherical configuration, and the distance difference of the gradients are within approximately 2 microns or less.

Further another aspect of the present invention is to provide the hydrodynamic bearing assembly comprises: a radial bearing including a column shaft having an outer surface parallel to an axis, and a hollow cylindrical sleeve having an inner surface rotatably arranged around the outer surface of the shaft, the iradial bearing for generating a radial dynamic pressure due to a relative rotation between the sleeve and the shaft; a thrust bearings including a thrust plate formed or secured on one end surface of the shaft along the axis, and a thrust opposing surface formed or secured on one end surface of the sleeve along the axis, the thrust bearing for generating a thrust dynamic pressure due to the relative rotation between the thrust plate and the thrust opposing surface; and a second thrust plate covering the hollow cylindrical sleeve at the other end surface along the axis; wherein a first gap a defined parallel to the axis between the other end surface of the shaft and the second thrust plate, and a second gap b defined parallel to the axis between the thrust plate and thrust opposing surface satisfy the following condition;

$a<b.$

The second thrust plate is provided so that the total weight of the rotational member is supported between the second thrust plate and the shaft when the bearing assembly is halted. This reduces the arm length of the friction when restarting (activating) the bearing assembly, thus eventually improving the activation feature of the hydrodynamic bearing assembly. Preferably any one of the second thrust plate and the other end surface of the shaft has a spherical, cone, or frustum boss, because the contacting points between the second thrust plate and the shaft can be closer to the axis.

Further another aspect of the present invention is to provide the hydrodynamic bearing assembly, in which one or more of opposing portions among the shaft, the sleeve, the thrust plate, and the thrust opposing surface, and the second thrust plate are made of ceramics material. The ceramics material is selected from a group consisting of alumina, zirconia, silicon carbide, silicon nitride, and sialon. Usage of the ceramics material having high anti-abrasion reduces the friction during the rotation with contact and provide the hydrodynamic bearing assembly having the high rigidity and the high accuracy.

Further another aspect of the present invention relates to provide a spindle motor incorporating the hydrodynamic bearing assembly having the improved activating feature and the high rigidity as described above, as well as to provide a memory device or a bar code scan reader incorporating the spindle motor. This invention is to provide such products having the high stability, the high reliability, and the high endurance.

PREFERRED EMBODIMENTS OF THE INVENTION

First Embodiment

The first embodiment of the hydrodynamic bearing assembly according to the present invention will be described hereinafter with reference to the drawings. As described above, a plurality of spiral grooves conducts the fluid such as air from the circumference so that the thrusting dynamic pressure is generated in the thrust bearing. The relative rotation in the thrust bearing pumps the conducted fluid towards the inner portion (adjacent to the outer surface of the shaft) so that the dynamic pressure adjacent to the shaft is increased, thereby to keep the rotational member floating. The computation of the dynamic pressure distribution indicates the high value adjacent to center of the axis, or adjacent to the land portion 9 and the edges of the grooves 5 when the land portion 9 is provided as shown in FIG. 10. Also, the computation of the dynamic pressure distribution indicates the gradually decreasing value towards the circumference. Thus, the conventional hydrodynamic bearing assembly generates the peaks of the dynamic pressure distribution localized in some portions in the thrust bearing.

Figure 1:
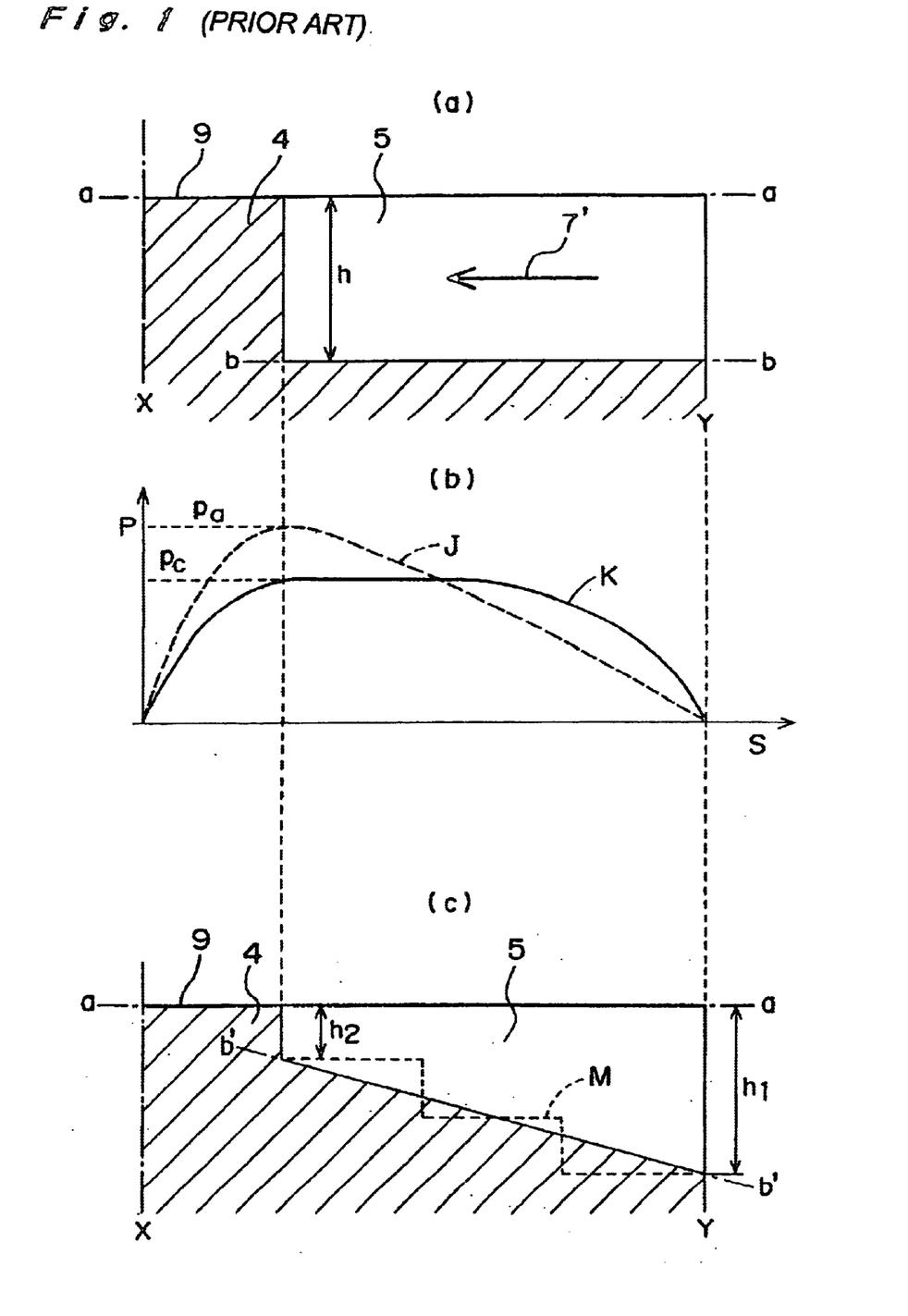
FIG. 1 is a schematic view illustrating the relation between the configuration of the groove and the dynamic pressure distribution.

FIG. 1(a) shows a schematic cross section of the groove 5 formed on the conventional thrust plate 4. As described above, the groove 5 has a spiral configuration when viewing from the top, meanwhile, FIG. 9 shows a cross section taken in radial direction, on which the groove 5 is projected. In the drawing, X and Y represent the radial positions of the outer surface of the shaft (or the inside portion of the thrust plate 4) and the outer surface of the thrust plate 4, respectively. A land portion 9 is extended from the outer surface of the shaft by a predetermined distance. In FIG. 1(a), the groove 5 having a depth h is formed on the thrust plate 4, followed by the land portion 9. The lines a—a and b—b represent the top surface of the thrust plate 4 and the bottom surface of the groove 5, respectively. The arrow 7' represents the direction of the fluid flow in the groove 5, and the arrow 7 shown in FIG. 10 is illustrated on the radial cross section as the arrow 7'. The groove 5 shown in FIG. 1(a) has a radially outer end open to the circumstance. The conventional spiral groove 5 has an even depth of h as illustrated in FIG. 1(a).

The dotted line J in FIG. 1(a) represents the dynamic pressure distribution generated by the conventional grooves 5 during the rotation, which is also illustrated on the radial cross section. The transverse S-axis in FIG. 1(b), corresponding to FIG. 1(a), indicates the distance from the inside portion of the thrust plate 4 towards the circumference, and also the vertical P-axis shows the dynamic pressure. Both of the inner portion and the outer portion of the thrust bearing are presumably open to the circumstance so that the dynamic pressure in each portion has the same dynamic pressure. The dynamic pressures at the inner and outer portions equal to one of the circumstance, i.e., zero. When the radial bearing connects with the thrust bearing, the dynamic pressure distribution has a tendency similar to that indicated by the dotted line J in FIG. 1(b) except that the dynamic pressure at the inner portion is increased. The dynamic pressure distribution of the prior art thrust bearing has the peak pressure Pa at the position adjacent to the groove edge and near the bearing center, and gradually decreases towards the circumference, as shown by the dotted line J in FIG. 1(b). The computations that the present inventors have conducted revealed the peak pressure Pa is approximately 1.59 atmospheric pressure (which is referred to simply as "atm"), in which the diameter of the thrust bearing is 20 millimeters, the thrust inner diameter is 14 millimeters, the groove width h is 2 microns, the bearing clearance during the rotation is 1.5 microns, and the rotation rate is 16,000 rpm. It is difficult to directly measure the dynamic pressure based upon the experimental data, however, the computation of the dynamic pressure; is consistent with the floating height (clearance) and the load capacity (rotational mass), thus the computation is presumably acceptable.

According to the present invention, the groove depth is modified according to the position between the inner portion and the outer portion along the transverse S-axis so that the uniform dynamic pressure distribution is generated in the radial direction. For example, the bottom surface b'—b' inclined relative to the top surface of the thrust plate 4 so that the groove depth is gradually decreased from h1 at a position of the outer portion to h2 at the inner end of the groove 5 interfacing with (in the vicinity of) the land portion 9. Like reference numerals are used as in FIG. 1(a). The conventional thrust bearing conducts and then compresses the fluid adjacent the interface portion between the land portion 9 and the groove 5, thereby to generate the dynamic pressure distribution with the peak in certain portions. Meanwhile, the thrust bearing according to the embodiment includes the grooves gradually shallower from hi to h2 as the position moves towards inner portion so that the dynamic pressure distribution is increased, in particular, adjacent to the outer end of the groove.

The hydrodynamic bearing assembly according to the present invention has the groove depth designed as described above so that the dynamic pressure is substantially leveled. When the groove 5 has the depth h1 of 2 microns at the outer end of the groove 5 and the depth h2 of 0.4 microns at the inner end of the groove 5 adjoining to the land portion 9, and the other dimensions and the rotation rate are identical to those indicated above, the peak pressure Pc is about 1.31 according to the computations conducted by the present inventors. The uniform dynamic pressure is substantially generated in the radial direction. Thus, although the peak pressure Pc is less than the peak pressure Pc of the conventional thrust bearing, the dynamic pressure of the embodiment is evenly distributed and the total bearing force thereof is the same as that of the conventional thrust bearing. Rather, the hydrodynamic bearing assembly of the embodiment has an advantage that it realizes a good counter force bearing an external vibration because the dynamic pressure at the portions away from the center is relatively high.

Figure 2:
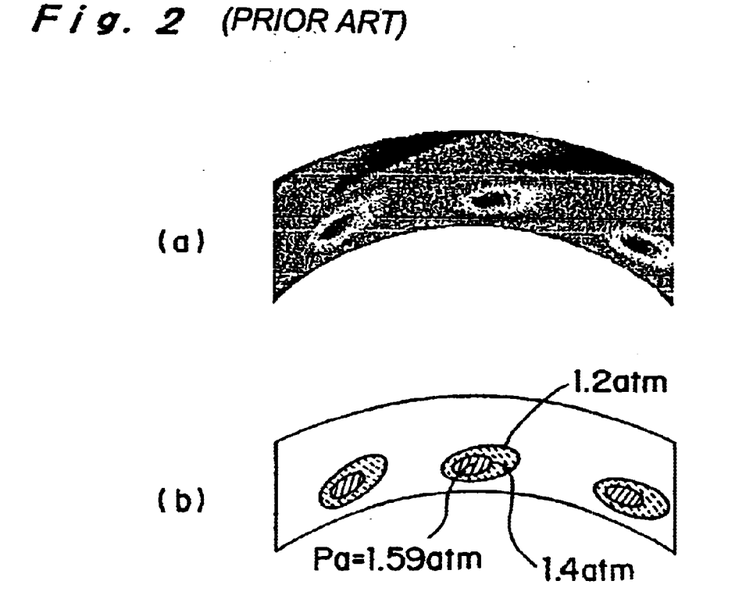
FIG. 2 is a computer analysis chart of the dynamic pressure distribution generated by the conventional thrust groove.
Figure 3:
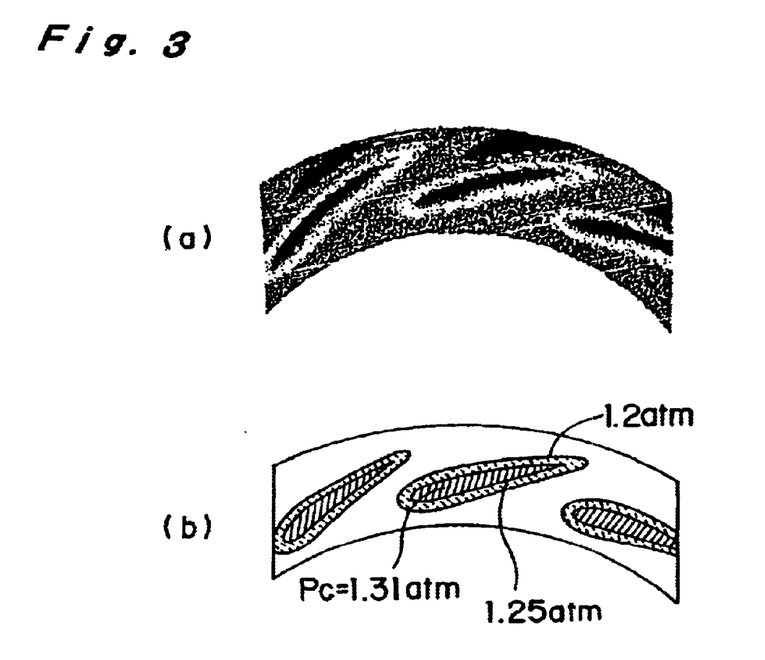
FIG. 3 is a computer analysis chart of the dynamic pressure distribution generated by the thrust groove according to the present invention.

FIGS. 2 and 3 are schematic views of the computations that the present inventors have conducted for the dynamic pressure distribution in the thrust bearing. In particular, FIG. 2(a) illustrates the computer analysis chart of the dynamic pressure distribution generated by the grooves of the prior art thrust bearing, and FIG. 2(b) is a graph of FIG. 2(a) illustrating some area of the dynamic pressure distribution. Both drawings illustrate the thrust bearing viewed from the above. As shown in FIG. 2(b), the highest pressure areas including the peak pressure point of 1.59 atms appear adjacent to the interface portions between the grooves 5 and the land portion 9, and another narrow pressure areas of approximately 1.4 atms appear around the highest pressure areas. Further, outside the narrow pressure areas, the dynamic pressure is gradually decreased. Thus, the areas of the high dynamic pressure are localized so that the configuration of the groove can hardly traced from the drawings.

Although similar to FIGS. 2(a) and 2(b), FIGS. 3(a) and 3(b) shows the present invention. FIG. 3(a) is the computer analysis chart of the dynamic pressure distribution generated by the grooves of the thrust bearing according to the present invention, and FIG. 3(b) is a graph of FIG. 3(a) illustrating some areas of the dynamic pressure distribution. As can be seen also from FIG. 3(b), according to the present invention, while the peak pressure is 1.31 atms that is relatively low, the highest pressure areas are evenly distributed so that the configuration of the groove can readily be recognized. Also, the highest pressure areas are further surrounded by another pressure areas of 1.2 atms. Those figures show that while the conventional thrust bearing supports the weight of the bearing assembly mainly and/or exclusively adjacent to the interface portions between the land portion 9 or the shaft and the grooves, the thrust bearing of the present invention supports the weight across the whole thrust surface.

The conventional hydrodynamic bearing assembly is activated, for example, with use of the fluid such as air containing humidity of 60% at the room temperature, the dew is very likely caused due to the maximum pressure of 1.59 atms. However, the dew is hardly caused under the maximum pressure of 1.31 atms according to the present invention. Thus, this reduces the risk that the hydrodynamic bearing assembly cannot be restarted due to the dew remaining in the thrust bearing.

The hydrodynamic bearing assembly of the embodiment is pump-in type, in which the fluid for generating the dynamic pressure is conducted from the circumference towards the inside portion of the thrust bearing. The spiral grooves 5 have configurations designed such that the rotation of the sleeve 3 directs the fluid from the circumference to the inside portion. Alternatively, a pump-out hydrodynamic bearing assembly may be configured by reversing the spiral direction of the grooves 5 or the rotational direction of the sleeve 3. The pump-out hydrodynamic bearing assembly, in general, conducts the fluid from the inside portion adjacent to the shaft towards the circumference of the thrust plate to generate the dynamic pressure increasing radially outwardly. Therefore, if the present invention is applied to the pump-out hydrodynamic bearing assembly, the grooves 5 is designed to have the gradient of the depth formed in a reversed manner relative to one indicated in FIG. 2(c), on the radially outer surface when the land portion 9 is provided.

Another dotted line M in FIG. 1(c) illustrates the alternative of the embodiment, in which the groove 5 is designed to have steps discretely decreasing the depth towards the inside portion, rather than the gradient gradually decreasing. Such stepped groove 5 may readily be formed with use of the shotblasting or the laser machining in combination with masks. The resultant stepped grooves 5 have the advantage similar to that with slope described above. However, for the smooth flow of the fluid, the more preferably, the more steps are formed and the less depth by one step is provided.

Although the embodiment has been described above, in which the grooves 5 for generating the dynamic pressure are formed on the thrust plate 4, the grooves may be formed on the thrust opposing surface 13 opposing to the thrust plate 4. Further, the groove depths are illustrated in the drawings that they are designed to have linear slope or steps with regular intervals and heights, however, the purpose of the present invention is to generate the substantially uniform dynamic pressure distribution in the thrust bearing. Therefore, the groove depth may be formed such that they follow, for example, on a smoothed curve or on steps with different intervals and heights for leveling the dynamic pressure distribution.

The description has been made for the embodiments with respect to the thrust bearing, the present invention can also be applied to grooves 2 in the radial bearing. While the groove of the pump-in thrust bearing is designed as being shallower from the circumference towards the shaft, the radial bearing has the groove 2 designed such that it has a depth modified to be gradually shallower from the upstream side to the downstream side of the relative rotation (as indicated by the direction of the arrow 8 of FIG. 10). Also, the groove 2 may be formed on the inner surface of the sleeve 3 rather than the outer surface of the shaft 1.

EXAMPLE 1

As illustrated in FIG. 9, twelve grooves, each of which has the maximum depth of 2 microns and the width of 15 degrees, are formed on an area for generating the dynamic pressure in the thrust bearing, which has an outer diameter of 20 millimeters and an inner diameter of 14 millimeters. The land portion without any grooves formed thereon is provided in a region 0.75 millimeters away from the shaft. The spiral groove 5 is designed such that angle defined by the line between the inner end thereof and the center of the axis and the line between the outer end thereof and the center of the axis is 45 degrees.

(Sample A)

Sample A has the groove formed by the laser process, of which depth is linearly decreasing towards the axis. The groove includes the depth h1 (shown in FIG. 1(c)) of 2 microns at the outer end for conducting the fluid and the depth h2 (shown in FIG. 1(c)) of 0.4 microns at the inner end interfacing the land portion 9.

(Sample B)

Sample B has the groove formed by the blasting with use of a plurality of masks, of which depth is stepped as illustrated by the dotted line M in FIG. 1(c). The groove includes three steps with the regular intervals and the heights. As shown by the dotted line M in FIG. 1(c), the outer step has the depth h1 of 2 microns at the outer end for conducting the fluid and the inner step has the depth h2 of 0.4 microns at the inner end interfacing the land portion 9.

(Sample C)

Sample C is a comparative sample and has the groove formed by the blast process with use of one mask, of which depth is 2 microns across the groove, i.e., the step height of the step at the inner end interfacing the land portion 9 is 2 microns.

The hydrodynamic bearing assemblies incorporating those Samples supported a weight of 200 grams in total, and rotated on the plain plate at the rotation rate of 16,000 rpm for 10 minutes. The hydrodynamic bearing assemblies were evaluated as to whether the dew is generated therein by checking whether the hydrodynamic bearing assemblies were able to be rotated again soon after they were halted. Also, the floating heights during the stable rotation were measured. The room temperature was kept at 25 degrees Celsius, and the humidity were changed from 50% to 100%. Those tests were repeated 5 times at each humidity.

The tests revealed the highest humidities capable of rotating the hydrodynamic bearing assemblies in a reliable manner were 90%, 85%, and 75% for Sample A, B, and C, respectively. Each of the samples; had the floating heights of approximately 1.5 microns during the reliable rotation, which are consistent with the computations.

Second Embodiment

Figure 4:
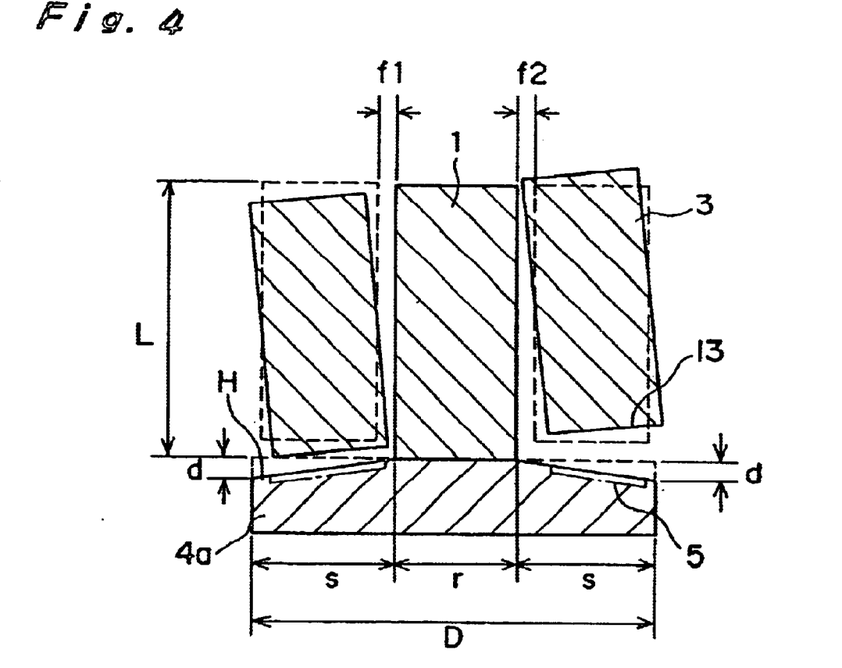
FIG. 4 is a cross section of one embodiment of the hydrodynamic bearing assembly according to the present invention.

Next, the second embodiment of the hydrodynamic bearing assembly according to the present invention will be described hereinafter with reference to the drawings. FIG. 4 illustrates the hydrodynamic bearing assembly of the embodiment. The sleeve 3 is rotatably arranged around the cylindrical shaft 1 with a predetermined gap. Also the shaft 1 has the bottom end secured on the thrust plate 4a perpendicularly to the axis. The thrust plate 4a includes the grooves for generating the dynamic pressure, formed on the surface thereof opposing to the bottom surface of the sleeve 3. The bottom surface of the sleeve 3 opposing to the thrust grooves 5 is referred to as the thrust opposing surface 13.

During the rotation of the hydrodynamic bearing assembly so constructed, the rotational driving force between the stator coil and the rotor magnet (not shown) of the spindle motor rotates the rotor and the sleeve 3 secured with the rotor, so that the radial dynamic pressure is generated between the shaft 1 and the sleeve 3 due to the relative rotation therebetween. Also, the relative rotation between the thrust opposing surface 13 of the sleeve 3 and the thrust plate 4a generates the thrust dynamic pressure. The radial and the thrust dynamic pressures rotate the rotational member such as the sleeve 3 around the shaft 1 without any contact.

According to the embodiment, the surface of the thrust plate 4a having the thrust grooves is inclined relative to the thrust opposing surface 13 such that the surface of the thrust plate 4a deviates from the thrust opposing surface 13 towards the radial circumference. The inclined surface keeps the thrust plate 4a away from the sleeve 3 because the circumference H of the thrust plate has the greater gap from the thrust opposing surface 13, even if the external force is applied. To this end, the sleeve 3 is inclined relative to the shaft 1 and the thrust plate 4a as illustrated by the solid line in FIG. 4.

Needless to say, if the inclining angle of the thrust plate 4a relative to the sleeve 3 is greater, then preferably, the risk of the contact between the sleeve 3 and the thrust plate 4a is smaller. However, since the thrust plate 4a generates the thrust dynamic pressure in cooperation with the thrust opposing surface 13, when the inclining angle is so great, the sufficient thrust dynamic pressure can hardly expected. Therefore, preferably, the inclining angle is great enough to avoid the contact and small enough to generate the thrust dynamic pressure sufficiently.

In the vertical cross section of FIG. 4, the thrust plate 4a is linearly formed such that it has the inclining angle of the gradient d as the height along the axis for the thrust width s from the innermost portion of the thrust bearing (outer surface of the shaft 2 arranged on the thrust plate 4) to the outermost portion thereof (the circumference of the thrust plate 4). The thrust plate 4a having the thrust grooves 5, as whole, has in a frustum shape. As illustrated by the dotted lines in FIG. 4, the shaft 1 operates in a normal manner, and radial gaps between the shaft 1 and the sleeve 3 and the total gap thereof are referred to as f1, f2, and F (f1+f2), respectively, also the radial bearing has the length L along the axis. Then, the maximum gradient of the sleeve relative to the shaft in the radial bearing is;

$$F/L$$

Therefore, in order to prevent the: contact of the circumference H of the thrust plate 4a, the maximum gradient of the thrust plate 4a relative to the sleeve in the thrust bearing is less than that in the radial bearing. That is, the contact in the thrust bearing is avoided if the following condition is satisfied;

$$F/L \leq d/s$$

The experiments that the present inventors have conducted revealed that if the length L of the thrust bearing is 15 millimeters, the total radial gap F is 4 microns, the diameter D of the thrust plate 4 is 20 millimeters, and the gradient d is 2 microns, any contact in the thrust bearing can be avoided satisfactorily. Preferably, the gradient d of approximately 2 microns or less ensures the thrust dynamic pressure sufficiently.

Another advantage of the hydrodynamic bearing assembly according to the embodiment is capability of reducing the torque required at the activation of the hydrodynamic bearing assembly. As can be seen also from FIG. 4, when the hydrodynamic bearing assembly according to the embodiment is halted, the total weight of the rotational member secured with the sleeve 3 is applied to a portion of the thrust plate 4 where the thrust opposing surface 13 of the sleeve 3 and the thrust plate 4 contact with each other. On the contrary, in the conventional hydrodynamic bearing assembly, the full contact across the thrust opposing surface 13 of the sleeve 3 and the thrust plate 4 is caused when halted. Thus, the embodiment limits the contact surface thereof to a ring-shaped area of the thrust opposing surface 13 closer to the bearing axis, which is located only inside end portion.

Therefore, when restarting the hydrodynamic bearing assembly according to the present invention, since the weight is applied mainly to the portion adjacent to the rotation center, the arm length from the center weighted portion is reduced so that the torque can be minimized. This causes various advantages, including for example, reducing the capacity and the dimension of the motor, reducing the electric power consumption, and minimizing the rotation with contact by quickly increasing the rotation rate so as to reduce the abrasion between the contacting members, eventually extending the effective lifetime of the bearing assembly.

Figure 5:
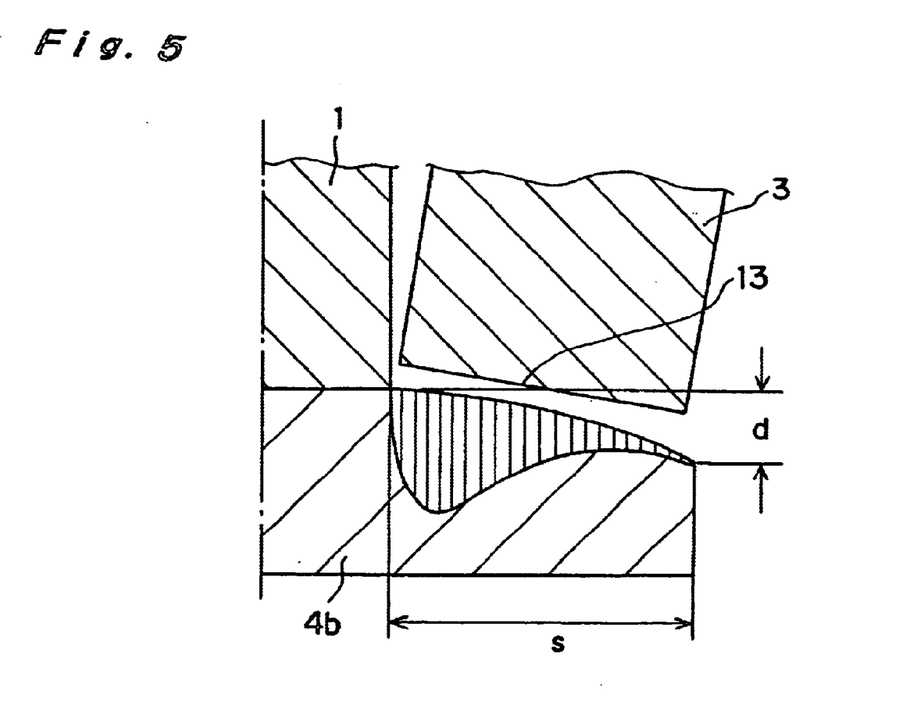
FIG. 5 is a cross section of an alternative of the hydrodynamic bearing assembly in FIG. 4.

FIG. 5 is a partially enlarged view of the alternative embodiment of the hydrodynamic bearing assembly, illustrating one side of the thrust bearing. Similar reference numerals denote the components similar to those in FIG. 4. In the vertical cross section, the thrust plate 4 is designed to have the configuration of a partial circle (arc-shaped) rather than the line, thus as a whole, the thrust plate 4 has an inclined surface with the spherical configuration.

The parallel lines indicated in the thrust plate 4b in FIG. 5 schematically illustrate the dynamic pressure generated in the thrust bearing. As described above, the thrust bearing conduct the fluid from the circumference of the thrust plate 4b, thus, the dynamic pressure adjacent to the circumference is low. Rather, the dynamic pressure is increased towards the outer side of the shaft, i.e., the inside portion of the thrust bearing. Most of the thrust dynamic pressure is generated adjacent to the shaft 1.

According to the alternative embodiment, the arc-shaped inclined surface of the thrust plate 4 causes the gradient thereof less adjacent to the bearing axis and more towards the circumference. This avoids the reduction of the thrust dynamic pressure adjacent the inside portion because of the close gap to the thrust opposing surface 13, and also keeps the outside portion of the thrust plate 4, which does not much contributes the dynamic pressure, away from the thrust opposing surface 13. Thus, the thrust plate 4 has the inclined surface with the arc-shaped configuration so that the thrust dynamic pressure is ensured and the contact therebetween is avoided.

The experiment that the present inventors have conducted revealed that, preferably, the gradient d of the thrust plate 4b is approximately 2 microns or less. The radius of curvature may be calculated from the gradient of 2 microns and the distance s between the innermost portion of the thrust bearing (the outer surface of the shaft 1) and outermost portion of the thrust bearing (the circumference of the thrust plate 4).

As described above, the cross section and the whole configuration of the inclined surface of the thrust plate 4 are referred to as being "arc-shaped" and "spherical", respectively. However, as can be seen from FIG. 5, a partial circle drawn between the innermost and outermost portions of the thrust bearing has the center offset from the bearing axis, thus, the whole configuration of the inclined surfaces on both sides is not completely spherical. While the true spherical configuration must have the center on the bearing axis, the shape of the both inclined surfaces of the thrust plate 4b is referred to be "spherical", for the convenience. In case where the innermost portion of the thrust bearing is close to the bearing axis, the inclined surfaces may be traced as the true partial circle with the center on the axis of the shaft 1. The circle has the radius calculated based upon the gradient d and the outer diameter of the thrust plate 4b. It should be noted that the thrust plate may have any configurations other than a true circle, for example, ellipse and parabola, if the surface of the thrust plate has the gradient d less adjacent to the bearing axis (the innermost portion of the thrust bearing) and more towards the circumference. The other configuration of the inclined surface leads the advantages similar to those of the second embodiment.

Also, the inclined surface is formed on the thrust plate 4 according to the embodiment including the above-mentioned variations, however, it may be formed on the thrust opposing surface 13 of the sleeve 3, which opposes to the thrust plate 4b, so as to achieve the same advantages. Further, the inclined surface may be formed on a thrust opposing plate as another component used for the different type of the bearing assembly. Even further, both of the thrust plate 4b and thrust opposing surface 13, which are opposing to each other, may be provided with the inclined surface. In this instance, the total gradient of each gradient of each inclined surface is preferably corresponding to the above-mentioned gradient d.

EXAMPLE 2

In the hydrodynamic bearing assembly having the rotational sleeve as illustrated in FIG. 4, the radial bearing has the diameter of 15 millimeters and the length of 15 millimeters, and the thrust plate has the outer diameter of 20 millimeters and inner diameter of 15 millimeters, also has the spiral grooves formed thereon with the depth of 5 microns for generating the thrust dynamic pressure. The spiral grooves may be formed by the shot-blasting, the laser abrasion, or the plasma-etching process.

Several samples of the motors incorporating the hydrodynamic bearing assemblies were prepared such that the inclined surface of the thrust plate had the gradients of 0.1, 0.3, 0.5, 1.0, 1.5, and 2.0 microns, respectively. The gradient is defined herein by the height difference between the heights along the axis at the innermost and outermost portions of the thrust bearing. The sample motors were driven with the electric power of 12 V to rotate at the rotation rate of 12,000 rpm. The electric current for activating the motor was evaluated as the peak current required for the stable rotation.

The pitching for oscillating the hydrodynamic bearing assembly was tested with use of the oscillation evaluation equipment including a stepping motor, while the motor rotated at various rotation rates within the angle of 60 degrees. The contact was observed by the noise from the rotor, which was monitored by the microphone. The rotation rate was recorded when the noise was observed. The higher rotation rate recorded when the noise is observed can be evaluated that the motor endures more satisfactorily against the pitching.

The test results revealed that the gradient d of 0.3 microns or more improves the features in the activation current and the pitching.

Third Embodiment

Figure 6:
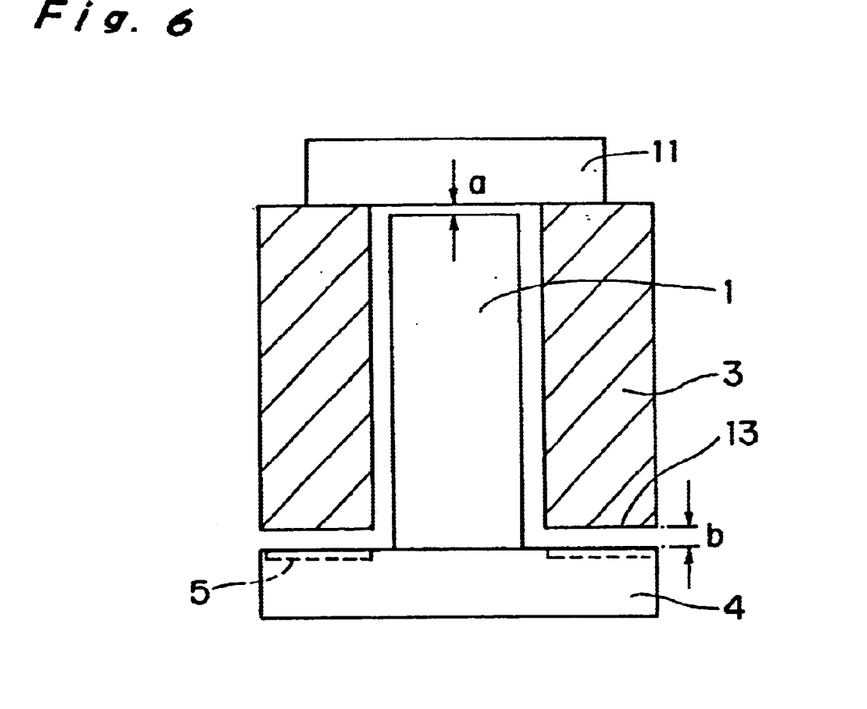
FIG. 6 is a cross section of another embodiment of the hydrodynamic bearing assembly according to the present invention.

Next, the third embodiment of the hydrodynamic bearing assembly according to the present invention will be described hereinafter with reference to the drawings. FIG. 6 illustrates the hydrodynamic bearing assembly of the embodiment. In the drawing, the cylindrical hollow sleeve 3 is arranged around the cylindrical shaft 1, and the thrust plate 4 connected perpendicularly with the sleeve 3 opposes to the bottom surface of the sleeve 3. Compared with the conventional hydrodynamic bearing assembly, the hydrodynamic bearing assembly of the embodiment further includes the second thrust plate 11. The second thrust plate 11 in a disk-shaped form is secured, for example by the adhesive, on the top end along the axis (the other end away from the thrust opposing surface 13) of the sleeve 3. The grooves 5 for generating the thrust dynamic pressure are formed on the surface of the thrust plate 4, which opposes to the thrust opposing surface 13 as the bottom surface of the sleeve 3.

During the rotation of the hydrodynamic bearing assembly so constructed, similar to those of above-mentioned embodiments, the sleeve 3 rotates relative to the shaft 1 and the thrust plate 4 so that the radial and thrust dynamic pressures are generated between the sleeve 3 and the shaft 1, and between the thrust opposing surface 13 as the bottom surface of the sleeve 3 and the thrust plate 4, respectively. Those dynamic pressures allow the sleeve 3 to rotate relative to the shaft 1 and the thrust plate 4 without any contact.

During the rotation illustrated in the drawing, when gaps of a and b are defined between the second thrust plate 11 and the top surface of the shaft 1 opposing thereto and between the thrust opposing surface 13 of the sleeve 3 and the thrust plate 4 (thrust bearing), respectively, the hydrodynamic bearing assembly is designed such that the gaps of a and b satisfy the following condition;

$$a<b$$

In the hydrodynamic bearing assembly so constructed, once no electric power is supplied with the spindle motor, the rotation rate of the rotational member is decreased, thereby reducing the dynamic pressures. This causes the floating rotational member to lower due to its weight. This causes, in turn, the second thrust plate 11 to contact with the top surface of the shaft 1, because of the condition of a<b. Eventually, the rotational member is halted, but the sleeve 3 is still kept away from the thrust plate 4. This means that the total weight of the rotational member such as sleeve 3 is loaded on the second thrust plate 11 and the top surface of the shaft 1 while the hydrodynamic bearing assembly is halted.

The spindle motor is then energized so that the rotational member of the hydrodynamic bearing assembly activates to rotate again. At the beginning, the lower rotation rate generates the thrust dynamic pressure less sufficiently for floating the rotational member, keeping the second thrust plate 11 and the top surface of the shaft 1 in contact with each other. Then, the higher rotation rate exceeding the predetermined rate allows the rotational member to float away from the stationary member. According to the conventional hydrodynamic bearing assembly, the full contact between the thrust plate 4 and the thrust opposing surface 13 requires the torque moment against the friction generated far from the center (i.e., the arm length is long). On the contrary, the full contact between the second thrust plate 11 and the top surface of the shaft 1 requires the torque much less than that of the prior art because the friction therebetween is applied adjacent to the center (i.e., the arm length is much shorter). To this end, the torque moment for activation can significantly be reduced.

In addition, when the rotation rate for floating the rotational member is unchanged, the relative velocity between the contacting surfaces according to the embodiment can also be reduced proportionally to the shorter arm length. This also reduces the friction between the contacting surfaces, thereby to avoid the risk of the seizure thereon. The friction between the contacting surfaces according to the embodiment is minimized in comparison with that of the prior art, which in turn, facilitates to accelerate the rotation so as to achieve the floating rate at the earlier stage.

Meantime, when the above-mentioned condition i.e., a<b is met, if the width b is significantly greater than the width a, then the width difference (b−a) between the thrust opposing surface and the thrust plate 4, while the rotation is halted, is so great that the thrust dynamic pressure can insufficiently be generated. Otherwise, even if the thrust dynamic pressure is generated enough to float the rotational member, unfavorably, the second thrust plate 11 is very likely to contact with the top surface of the shaft 1 due to the oscillating motion applied to the bearing assembly. Once the contact is happened therebetween, the rotation becomes unstable and the HDD incorporating the bearing assembly may malfunction.

In order to prevent the disadvantage, the gap difference of a and b should be minimized. It is understood, in general, that if the gap difference between the two members rotating relative to each other is 2 microns or less, then the floating force in the thrust bearing is increased. Thus, because of the above-mentioned oscillation motion, the second thrust plate 11 moves closer to the top surface of the shaft 1 and before contact thereto, the gap between the thrust opposing surface and the thrust plate 3 is less than 2 microns so that the floating force can be increased. To this end, the contact is likely to be avoided. Therefore, the following condition is preferably met;

$$0<b-a \leq 2 \text{ microns.}$$

To ensure the disadvantage to be prevented, the gap difference between a and b should be minimized, and the gap of b between the bottom surface of the sleeve 3 and the thrust plate 4 is reduced so that the floating force in the thrust bearing is increased. Thus, more preferably, the gap difference satisfies the following condition;

$$0<b-a \leq 0.5 \text{ microns.}$$

Further, in order to avoid the contact between the second thrust plate 11 and the top surface of the shaft 1 due to the external oscillation, another means for generating the thrust dynamic pressure may be provided therebetween. Thus, another grooves similar to grooves 5 for generating the thrust dynamic pressure may be formed on either surface of the second thrust plate 11 or the top surface of the shaft 1. Such another grooves generate the thrust dynamic pressure (the repulsion force against the contact thereof) to avoid the contact therebetween. Since this floating force is stronger as the gap therebetween is narrower, the force gives a favorable influence in avoiding the contact.

Figure 7:
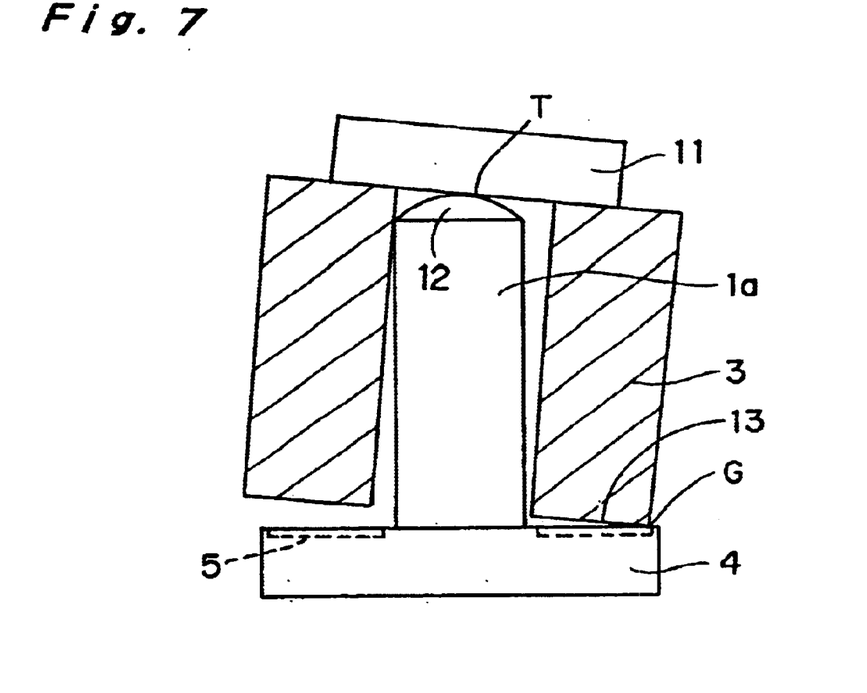
FIG. 7 is a cross section of an alternative of the hydrodynamic bearing assembly in FIG. 6.

FIG. 7 illustrates the alternative hydrodynamic bearing assembly of the embodiment. In the drawing, while the hydrodynamic bearing assembly is halted, the top surface 12 of the shaft 1a is formed as being curved. Other structure is similar to that of the third embodiment. The top surface 12 of the shaft 1a is curved such that the second thrust plate 11 and the top surface 12 of the shaft 1a, when halted, contact with each other at a contacting point T substantially in the center position of the bearing assembly. The aforementioned arm length of the friction force generated when activating the rotation can be set as substantially zero, thereby to further reduce the driving torque.

The curved top surface 12 of the shaft 1a causes the rotational member to tilt and contact with the thrust plate 4 at another contacting point G between the thrust opposing surface of the sleeve 3 and the thrust plate 4 so that the rotational member is supported in a stable manner as shown in the drawing. This may also be happened in the first embodiment, for example if the shaft 1a is too thin or if the outer surface of the shaft 1a has the offset perpendicularity to the end surface of the shaft 1a. However, in general, since the shaft 1a has the diameter of approximately 10 to 15 millimeters and the length of approximately 10 to 20 millimeters, and the gap in the diameter direction is approximately 1 to 5 microns, the degree of the tilt of the sleeve 3 is very small.

In case where the thrust opposing surface contacts with the thrust plate 4 even at a point, the friction force applied at the point is inevitable. However, as can be imagined from the drawing, since the center of gravity is located adjacent to the rotation axis, almost all weight of the rotational member is applied on the contacting point T between the top surface of the shaft 1a and the second thrust plate 11, and slight weight thereof is applied to the thrust plate 4 on the contacting point G. To this end, the friction force on the contacting point G in activating is very limited because of the slight weight thereon. Particularly, in comparison with the conventional thrust bearing in which the thrust opposing surface 13 and the thrust plate 4 are in full contact, the activating torque according to the present invention is significantly reduced even where the contacting point G contributes the friction force to some extent.

In the drawing, the curved top surface 12 of the shaft 1a is formed as being spherical, any geometrical configuration such as the cone and frustum configurations can be adapted, if the top surface 12 causes the contacting point to keep closer to the beating axis. Also, any types of configurations may be shaped with the curved surface on the second thrust plate 4 (rather than the top surface of the shaft 1a) opposing to the top surface of the shaft 1a.

Fourth Embodiment

Next, the fourth embodiment of the hydrodynamic bearing assembly according to the present invention will be described hereinafter. As discussed above with reference to FIG. 6 of the third embodiment, the perpendicularity between the shaft 1 and the thrust plate 3 secured thereon is critical for narrowing the gap between the thrust opposing surface of the sleeve 3 and thrust plate 4, thereby increasing the floating force. The sleeve 3 is arranged around the shaft 1, and rotates relative to the shaft 1 so as to generate the dynamic pressure. Thus, the precise perpendicularity ensures the gap even between the thrust opposing surface 13 as the bottom surface of the sleeve 3 and the thrust plate 3 for the sufficient thrust dynamic pressure. Otherwise, the imprecise perpendicularity causes the insufficient dynamic pressure.

The experiment the present inventor have conducted revealed that for example, when the disk-shaped thrust plate of the diameter of 20 millimeters is used, if the circumference of the thrust plate 4 has the perpendicularity deviation of 0.7 microns or less relative to the shaft 1, then dynamic pressure in the thrust bearing is generated sufficient enough to achieve the satisfactory tilt rigidity. In general, the trust plate 4 has the disk-shape having the diameter of approximately 20 millimeters. By keeping the perpendicularity deviation of the gap to be 0.7 microns or less, the second thrust plate 11 can be kept away from the top surface of the shaft 1. To generalize the relations between the diameter and the perpendicularity deviation, the perpendicularity between the shaft 1 and the thrust plate 4 secured thereon is referred that it has approximately 0.7 microns/20 millimeters. This ratio can be applied to another thrust plate having diameters rather than 20 millimeters, also to another thrust plate, which is not directly secured to the end of the shaft, but indirectly secured through another component.

Fifth Embodiment

Next, the fifth embodiment of the hydrodynamic bearing assembly according to the present invention will be described hereinafter. The components of the hydrodynamic bearing assembly are made of ceramics material having the high anti-abrasion, the high endurance, the compact dimensions, and the high rigidity. The applicable ceramics material includes, for example, alumina, zirconia, silicon carbide, silicon nitride, and sialon.

For example, an alumina-based ceramics has the Young's modulus within the range of approximately 300 to 400 giga-Pascals, which is about double to the steel, and the specific gravity of 3.9 which is about half of the steel. Thus, briefly speaking, the alumina-based ceramics provides the rigidity double with half mass in comparison with steel. If the bearing assembly is made of ceramics material, it can reduce its volume and weight, and can improve its anti-abrasion and endurance in comparison with stainless steel. In the hydrodynamic bearing assembly, since the rotational member starts rotating in contact with the stationary member when halted, the friction and the seizure may be caused between the members. By making those members of ceramics material showing the good anti-abrasion, such problems can readily be avoided. The hydrodynamic bearing assembly used for the spindle motor incorporated in the HDD is required to be formed and assembled with high accuracy. Ceramics materials are less susceptible to the plastic deformation and the elastic deformation than metal materials. Thus, usage of the ceramics materials reduces the deformations in processing so as to, provide a precise hydrodynamic bearing assembly.

The hydrodynamic bearing assembly shown in FIG. 6 has components, which may all be replaced with ones made of ceramics material. However, only surfaces opposing to the another rotating parts may be replaced with ones made of ceramics material taking consideration of the cost-performance. For example, the core member of the shaft 1 may be made of stainless steel, and the cylindrical hollow member made of ceramics material may be formed on the outer surface of the shaft 1 by shrink fitting, cooling fitting or bonding with the adhesive.

Sixth Embodiment

Next, the sixth embodiment of the hydrodynamic bearing assembly according to the present invention will be described hereinafter. The sixth embodiment according to the present invention relates to a spindle motor, and a memory device and bar code scan reader incorporating the spindle motor. As above, usage of the hydrodynamic bearing assemblies according to the present invention provides the spindle motor minimizing the friction between the contacting members when activated without requiring the less torque, thereby realizing the efficient operation thereof. Also, the abrasion on contacting surfaces can be minimized, the spindle motor having the high endurance can be realized. And by incorporating the spindle motor, the memory device and the bar code scan reader which are efficient and reliable, are obtained.

As described above for various embodiments of the present invention, the exemplary drawing is illustrated, in which the stationary member includes the shaft and the thrust plate, and the rotational member includes the sleeve. However, this invention is not limited thereto, and also applied to the hydrodynamic bearing assembly, in which the stationary member includes the sleeve and the rotational member includes the shaft and the thrust plate.

Advantages of the Invention

To summarize the advantages of the present inventions, the thrust spiral grooves formed on the thrust bearing have the depth gradually shallower from the circumference towards the bearing center, and radial spiral grooves formed on the radial bearing have the depth gradually shallower towards the downstream. This allows the dynamic pressure generated adjacent; to the center in the thrust bearing and the downstream in the radial bearing to increase locally without the keen peak, thereby maintaining the high dynamic pres sure substantially in the wide area. In turn, the maximum pressure required to generate the floating force is reduced so that the dew generated due to the compression in the hydrodynamic bearings can be prevented and also the counter force against the external oscillation force to the thrust bearing can generally be improved.

According to the prior art hydrodynamic bearing assembly, since the thrust plate opposes in parallel to the thrust opposing surface (or thrust opposing plate), when the external factor of the oscillation causes them to tilt relative to each other, the thrust plate may contact with the thrust opposing surface. On the contrary, according to the present invention, the surface of thrust plate is inclined from the inside portion towards the radial circumference so that the gap in the thrust bearing is wider towards the circumference. This allows the thrust plate to tilt relative to the thrust opposing surface without any contact, thus, the hydrodynamic bearing assembly can be obtained, which endures satisfactorily against the oscillation. Further, while the conventional hydrodynamic bearing assembly has the thrust plate and the thrust opposing surface in full contact with each other when halted, therefore, the activating torque for restarting the bearing assembly is significant. However, the inclined surface of the thrust plate according to the present invention allows the contacting surface of the thrust bearing when halted to became closer to the inner portion adjacent to the rotation center. This causes the arm length from the center to the weighting point to be shorter, thereby to reduce the activating torque.

In addition, the hydrodynamic bearing assembly according to the present invention includes the second thrust plate supported on the top surface of the shaft for bearing the total weight while the bearing assembly is halted. This avoids the full contact between the thrust plate and the thrust opposing surface and allows the total weight of the rotational member to be applied on the top surface of the shaft which has the shorter arm length from the center so that the activating torque can be reduced for restarting. Further, since the contacting point is closer to the axis, the relative motion rate to the floating rotation rate can be reduced. To this end, the abrasion between the contacting surfaces can be reduced and the seizure due to the friction can be avoided.

Also, the components of the hydrodynamic bearing assembly are made of ceramics material so that the endurance and the reliability of the hydrodynamic bearing assembly can be significantly improved.

What is claimed is:

1. A hydrodynamic bearing assembly, comprising:
   a column shaft having an outer surface and a top and bottom surfaces, said shaft extending in a longitudinal direction;
   a thrust plate secured on the bottom surface of said shaft so as to extend in a perpendicular direction to the longitudinal direction, said thrust plate having a circumference end and an upper and lower surfaces;
   a cylindrical hollow sleeve arranged around said shaft with a predetermined radial gap, said sleeve having an inner surface and a thrust opposing surface opposing to said thrust plate;
   a plurality of grooves formed on a surface selected from a group consisting of the outer surface of said shaft and the inner surface of said sleeve, for preventing a half-whirl, each of said grooves defining an upstream and downstream sides along a direction of a relative rotation;
   wherein upon the relative rotation of said sleeve and said shaft, a thrust gap is formed in fluid communication with the radial gap and between the thrust opposing surface of said sleeve and the upper surface of said thrust plate, and each of said grooves varying its depth for reducing the dynamic pressure generated adjacent to the downstream side of the groove.

2. The hydrodynamic bearing assembly according to claim 1, wherein each of said grooves is shallower as it extends from the upstream side to the downstream side in any cross sections taken along a surface perpendicular to the longitudinal direction so that the dynamic pressure generated adjacent to each of said grooves is substantially even.

3. The hydrodynamic bearing assembly according to claim 1, wherein at least one of the inner surface of said sleeve and the outer surface of said shaft is made of ceramics material.

4. The hydrodynamic bearing assembly according to claim 3, wherein the ceramics material is selected from a group consisting of alumina, zirconia, silicon carbide, silicon nitride, and sialon.

5. A spindle motor incorporating the hydrodynamic bearing assembly according to claim 1.

6. A memory device incorporating the spindle motor according to claim 1.

7. A bar code scan reader incorporating the spindle motor according to claim 1.

* * * * *